United States Patent [19]

Martin et al.

[11] Patent Number: 4,876,735
[45] Date of Patent: Oct. 24, 1989

[54] METHOD AND APPARATUS FOR CHARACTER RECOGNITION SYSTEMS

[75] Inventors: William C. Martin; Gene D. Rohrer, both of Charlotte, N.C.

[73] Assignee: International Business Machines Corporation, Armonk, N.Y.

[21] Appl. No.: 134,729

[22] Filed: Dec. 18, 1987

[51] Int. Cl.$^4$ .............................................. G06K 9/00
[52] U.S. Cl. .................................... 382/57; 382/7; 382/39; 382/62
[58] Field of Search ............... 382/57, 62, 7, 39, 38

[56] References Cited

U.S. PATENT DOCUMENTS

| | | | |
|---|---|---|---|
| RE. 31,692 | 10/1984 | Tyburski et al. | 382/57 |
| 3,496,543 | 1/1967 | Greenly | 382/9 |
| 3,641,495 | 2/1972 | Kiji | 382/38 |
| 3,876,981 | 4/1975 | Welch | 382/62 |
| 3,938,089 | 2/1976 | McGregor et al. | 382/62 |

*Primary Examiner*—David K. Moore
*Assistant Examiner*—Yon Jung
*Attorney, Agent, or Firm*—Bell, Seltzer, Park & Gibson

[57] ABSTRACT

The present invention employs a method of choosing between the output of two different character recognition systems to improve the rate at which characters are recognized, without significantly increasing the number of undetected substitution errors. If the first recognition system cannot recognize a character, a random probability generator is used to determine whether to use the output of the second recognition system, or alternatively to generate a reject character.

10 Claims, 1 Drawing Sheet

METHOD AND APPARATUS FOR CHARACTER RECOGNITION SYSTEMS

FIELD AND BACKGROUND OF THE INVENTION

This invention relates to the field of character recognition, and is especially applicable to magnetic ink character recognition (MICR) systems for reading documents which are printed with magnetic ink characters.

In the processing of documents encoded with magnetic ink character recognition (MICR) characters, it has been recognized that for increased processing efficiency it is desirable to reduce as much as possible the reject rate, that is the frequency at which the read head and associated recognition logic are unable to recognize a character as being a valid member of the character set. The processing of rejects requires manual intervention which reduces operating efficiency and increases the cost of document processing. In order to lower the reject rate, it has been proposed to use dual read systems, typically employing two different types of read heads which have different characteristics and capabilities in reading the characters, so that if the first read head is unable to recognize a character, the recognition of that character by the second read head would thus result in a successful reading of that document and would thereby lower the reject rate. Once such dual read head recognition system is disclosed in U.S. Pat. No. 3,938,089 issued Feb. 10, 1976.

A factor which has not been addressed by prior character recognition systems is the comparative economic consequences of rejects and substitution errors. While the manual processing of "rejects" reduces efficiency and increases costs, it is far more costly to correct undetected "substitution errors" (i.e. where the recognition logic incorrectly reads a character and substitutes an incorrect character for the correct character). In the case of processing checks for example, documents containing substitution errors pass through the system undetected may not be discovered until much later, for example after the check has been sent to another bank or has been posted incorrectly to a customer's account. At this later time, it is much more costly to correct the error. The cost of manually correcting a substitution error can be from 50 to 100 times the cost of manually correcting a reject. However, substitution errors occur with significantly less frequency than rejects. The present invention is based upon a consideration of the economic impact of substitution errors and rejects in order to provide greater overall efficiency in the operation of the document reading system. Moreover, as will be apparent from the explanation which follows, the present invention employs a novel and somewhat unconventional approach in achieving this improvement in overall cost efficiency.

SUMMARY OF THE INVENTION

The present invention employs a method of choosing between the output of different character recognition systems to improve the rate at which characters are recognized, without significantly increasing the number of undetected errors (substitution errors). If the first system cannot recognize a character, a random probability generator is used to determine whether to use the output of the second recognition system, or alternatively to generate a reject character.

For example, a multi-gap magnetic character read head reading AC magnetized characters has a very high recognition rate when reading high quality printed magnetic characters, ut sometimes the AC system cannot recognize the character and a reject character is generated in the place of the unrecognizable one. If the same characters are magnetized with a DC field and read with a single gap read head, some of the rejected characters may be recognized and the need to manually recognize the character is avoided. For example, the DC system is better able to read characters covered with cellophane tape or the like. There is a danger, however, if the AC system cannot recognize a character and the DC system does recognize the character, that the DC system is, in fact, in error and that choosing the output of the DC system would result in an undetected substitution error. The present invention takes into account the possibility that the choice of the DC system output, in lieu of a reject character generated by the AC system, will introduce a number of undetected substitution errors. The cost of fixing an undetected substitution error may be 50 to 100 times as much as the cost of finding the correct character for a reject. Thus, it may cost more to correct these undetected substitution errors than it will cost to correct even a larger number of rejects that were generated by the AC system alone. If the quality of the printed characters is good, and the AC system generates a reject character, the probability is greater that a non-reject output from the DC system will be correct. On the other hand, if the print quality is poor, the probability that the DC output is correct becomes lower and since undetected substitution errors are so costly to fix, the use of the DC output in this instance would be very costly. The method of the present invention accommodates these factors by only using the output of the DC system with a probability p that is related to the print quality and to the cost of fixing undetected substitution errors. The probability p can be set in advance or can be dynamically determined from the reject rate of one or both of the recognition systems. The use of probability tempers both the good results that would be obtained if each DC output corresponding to an AC system reject were in fact correct and the disastrous results that obtain from substituting any significant number of incorrect characters for rejects generated by the AC system.

In its broad aspects, the document-reading machine of the present invention comprises:
  a first character reading system mounted for reading characters on documents;
  a second character reading system also mounted for reading said characters on said documents;
  first character recognition logic for recognizing characters read by first system and generating a reject character when a character cannot be recognized, said first logic periodically creating a first undetected error by recognizing a character when a reject character should have been generated;
  second character recognition logic for recognizing characters read by said second system and generating said reject character when a character cannot be recognized, said second logic periodically creating a second undetected error by recognizing a character when said reject character should have been generated;
  decision logic for choosing one of: a character recognized by said first logic, said reject character, and a character recognized by said second logic, as the character most accurately representing a character on said document; and said decision logic including means for substantially randomly choosing with a probability of p, said character generated by said second logic when said first logic generates said reject character, where p is a probability having a value of from 0 to 1; and means for setting the value of said probability p.

BRIEF DESCRIPTION OF THE DRAWINGS

Some of the features and advantages of the invention having been stated, others will become apparent as the description proceeds, when taken in connection with the accompanying drawings, in which.

DETAILED DESCRIPTION OF THE INVENTION

The theory underlying the present invention and its practical economic value will be understood more fully from the detailed description which follows which includes first, an explanation of the development of the comparative cost analysis and cost equation; and secondly an example of the application of these principles to real data from a document processing operation.

Figure 1:
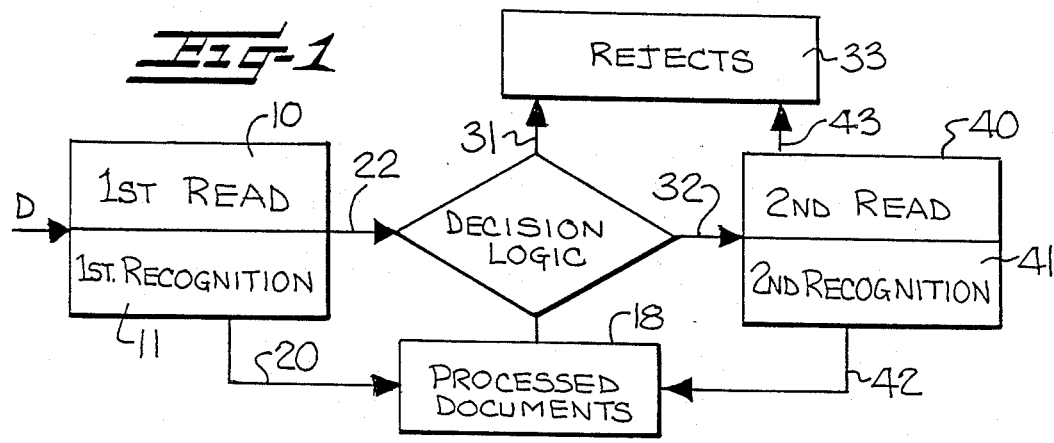
FIG. 1 is a schematic representation of the sequence of logical operations in a check processing system in accordance with the present invention.

The logical operations involved in the present invention are illustrated in FIG. 1. The documents to be processed, indicated by the reference character D, are first processed by a first character reading system, indicated by the reference character 10, and its associated character recognition logic, indicated at 11. Because of its overall greater accuracy under most circumstances, an alternating current read system is preferred for use as the first read system. Documents whose magnetic characters have been successfully recognized by the first read system are represented by the arrow 20, and are identified as "good documents", while documents containing reject characters resulting from the non-recognition of a character by the first read system are indicated by the arrow 22 and are referred to as "rejects". The rejects emanating from the first read system are processed by a decision logic 30 which selects whether the document will be processed by a second read system 40 or whether the document will be classified as a reject, as indicated by line 31, and routed to a reject bin 33. Those documents which have been classified as rejects and deposited in the reject bin 33 will require manual processing for recognition of the printed characters.

Those documents, indicated by reference character 32, which have been accepted for processing by the second read system are then read by the second read system 40 and its associated recognition logic 41. If the characters of the document are successfully recognized, then it is classified as a "good document" and routed to the good document bin 18, as indicated by the arrow 42. Those documents which are unsuccessfully recognized by the second read system 40 are classified as rejects and routed to the reject bin 33 for manual processing, as indicated by the arrow 43.

In the operation of the decision logic 30, the decision whether to immediately classify the document as a reject or to accept the document for further processing by the second read system 40 is determined substantially at random by a random decision maker. The probability of a document being accepted is represented by the probability parameter p, where p is a number ranging from 0 to 1. With a probability p of 0, no documents would be accepted via arrow 32 for processing by the second read system 40, and all of the documents 22 processed by the decision logic 30 would be classified as rejects 31. On the other hand, with a probability of one, all of the documents 22 would be processed via arrow 32 by the second read system 40 and no documents would be classified as rejects at arrow 31.

It will also be appreciated that those documents reaching the good document hopper 18 via arrow 20 will include not only correctly identified documents, but also a certain number of documents containing undetected substitution errors resulting from the first read system. Similarly, those documents indicated at 42 which have been successfully read by the second read system will include not only good documents but also a certain number of documents containing undetected substitution errors resulting from the second read system. Because the second read system is only reading documents which were of poor quality and were incapable of being read by the first read system 10, the likelihood of undetected substitution errors resulting from the second read system 40 is greater than that from the first read system.

An equation defining the total cost in rejects can be derived as follows: where, D is the total number of documents;

$RR_x$ is the reject rate for the read system x;

$SR_x$ is the substitution rate for the read system x;

$R_x$ is the total number of rejects from the system x;

$S_x$ is the total number of substitutions from the system x; and p is the probability of acceptance of a document.

The number of rejects from system 1 ($R_1$) reaching the decision logic 30 can be represented by the relationship:

$$R_1 = D \times RR_1$$

The total number of rejects $R_t$ can be determined by the sum of the rejects generated by the second read system 40 (arrow 43) and documents which are classified as rejects by the decision logic (arrow 31). This may be represented as follows:

$$R_t = p(R_1 \times RR_2) + (1-p) R_1$$

The total substitutions $S_t$ can be defined as follows:

$$S_1 = D \times SR_1$$

$$S_t = S_1 + p (R_1 \times SR_2)$$

Then the total cost in misreads can be determined, knowing the misread cost ratio. The misread cost ratio, F, represents the ratio of the cost of a substitution to the cost of a reject. Thus, the total cost (in rejects) can be defined as follows:

$$Cost = R_t + F \times S_t$$

Figure 2:
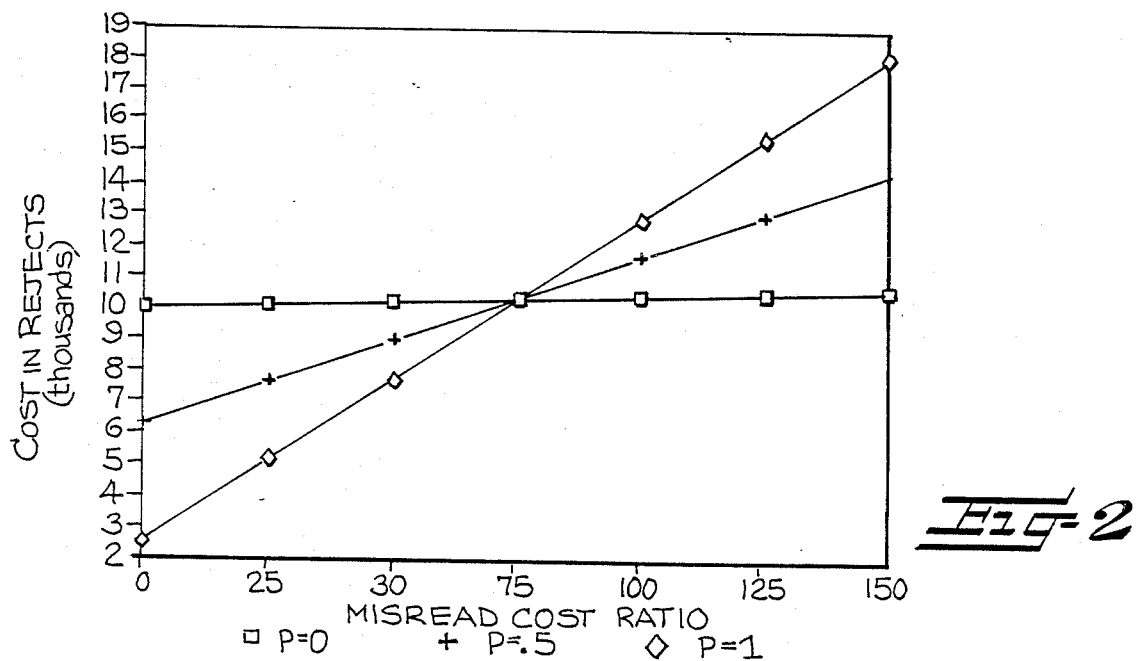
FIG. 2 is a graph illustrating the relationship between the misread cost ratio and the total cost in rejects.

FIG. 2 illustrates graphically the application of this equation to the limiting cases where p equals 0 and p equals 1, as well as to an intermediate case where p equals 0.5. In this example, the following constants were used: D=1,000,000; RR1=0.01; SR1=0.000005; RR2=0.25 and SR2=0.01. From this curve it will be seen that the lowest cost in rejects occurs with p equal 1 as the misread cost ratio F increases from 0 to 75. Above a misread cost ratio of 75, the lowest reject cost results from p equals 0.

EXAMPLE

The following example illustrates the economic effect of the application of the principles of the present invention to a particular situation. Table 1 below shows the distribution of reject rates and substitution rates derived from an actual run of one million documents. Over the range of reject rates encountered, the number of documents assumes a substantially normal distribution curve.

TABLE 1

| | | | | | | | |
|---|---|---|---|---|---|---|---|
| F | 50 | 50 | 50 | 50 | 50 | 50 | 50 |
| D | 25000 | 50000 | 200000 | 450000 | 200000 | 50000 | 25000 |
| $RR_1$ | 0.004 | 0.006 | 0.008 | 0.01 | 0.012 | 0.014 | 0.016 |
| $SR_1$ | 0.000005 | 0.000005 | 0.000005 | 0.000005 | 0.00001 | 0.00005 | 0.0001 |
| $RR_2$ | 0.01 | 0.02 | 0.04 | 0.08 | 0.16 | 0.32 | 0.64 |
| $SR_2$ | 0.0001 | 0.0001 | 0.0001 | 0.0005 | 0.01 | 0.05 | 0.25 |
| $RD_1$ | 100 | 300 | 1600 | 4500 | 2400 | 700 | 400 |
| $SD_1$ | 0.125 | 0.25 | 1 | 2.25 | 2 | 2.5 | 2.5 |
| Cost | | | | | | | |
| p = 0 | 106.25 | 312.5 | 1650 | 4612.5 | 2500 | 825 | 525 |
| p = .5 | 57 | 166.25 | 886 | 2598.75 | 2092 | 1462 | 2953 |
| p = 1 | 7.75 | 20 | 122 | 585 | 1684 | 2099 | 5381 |

Figure 3:
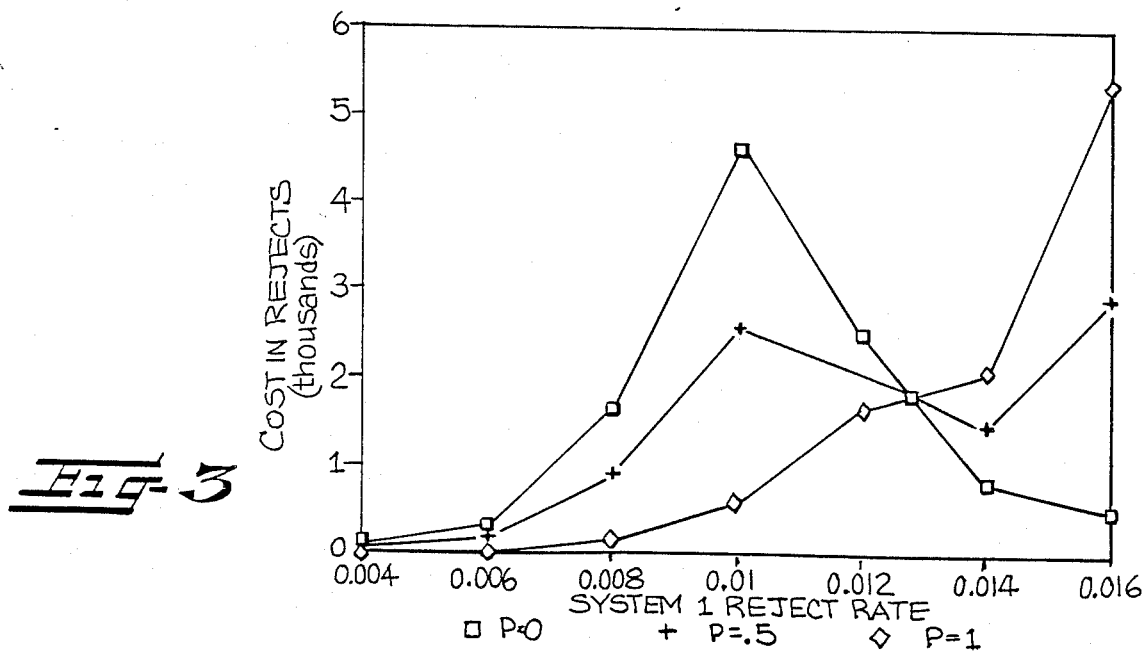
FIG. 3 is a graph illustrating the effect of variations in the reject rate upon the total cost in rejects.

The cost in rejects was calculated using the equation derived above over the range of reject rates encountered, using for purposes of example a misread cost ratio (F) of 50. FIG. 3 is a graph of the data from Table 1 showing the relationship of the cost in rejects to the first read system reject rate ($RR_1$) at a probability p of 0, 0.5 and 1. It will be seen that the three curves intersect at a reject rate of about 0.013. When the reject rate is below this point, the lowest cost in rejects is obtained where p equals 1, i.e. where all of the system 1 rejects are accepted. At a reject rate above about 0.013, the lowest cost in rejects is obtained where p equals 0, i.e. where none of the system 1 rejects are read by the second read system and all regarded as rejects. Obviously, the particular relationship illustrated in FIG. 3 will vary with changes in the misread cost ratio F, and with the particular reject rate encountered under a given set of circumstances. For example, the reject rate may vary depending upon such factors as the geographical source of the documents, the particular industry source of the documents, the specific types of documents being processed (e.g. travelers checks, personal checks, business checks, etc.), and even depending upon variations and the season or the weather. Thus, the optimum probability p for a given system may vary widely.

In a relatively simple and straightforward application of the present invention, the probability p can be manually set and adjusted as necessary when conditions change. In a more sophisticated application of the present invention, the reject rate is monitored and the setting of the value of the probability p is adjusted in response to changes in the reject rate encountered. Thus, for example, referring to the illustration in FIG. 3, it may be desirable to initially set the probability equal to 1 and to leave it at this value until the system reject rate exceeds a first predetermined value. For example, with specific reference to the example of FIG. 3, this predetermined value might be selected as a reject rate of 0.012. Then as the reject rate continues to increase, the value of the probability p would be decreased until the reject rate reaches a predetermined second value, (e.g. 0.014 in our FIG. 3 example), at which point the probability p would be set at 0. The setting of the probability p can also be made dependent upon other variables or factors, such as for example the reject rate from the second read system.

It should be evident from the foregoing description and examples that the present invention and the decision logic utilized therein can be advantageously applied to any two character reading systems—including magnetic ink character recognition systems, optical character recognition systems, or combinations thereof.

That which is claimed is:

1. A document reading machine comprising
   a first character reading system mounted for reading characters on documents;
   a second character reading system also mounted for reading said characters on said documents;
   first character recognition logic for recognizing characters read by first system and generating a reject character when a character cannot be recognized, said first logic periodically creating a first undetected error by recognizing a character when a reject character should have been generated;
   second character recognition logic for recognizing characters read by said second system and generating said reject character when a character cannot be recognized, said second logic periodically creating a second undetected error by recognizing a character when said reject character should have been generated;
   decision logic for choosing one of: a character recognized by said first logic, said reject character, and a character recognized by said second logic, as the character most accurately representing a character on said document; and said decision logic including means for substantially randomly choosing with a probability of p, said character generated by said second logic when said first logic generates said reject character, where p is a probability having a value from 0 to 1; and
   means for adjustably setting the value within the range said probability p within the range of from 0 to 1.

2. The document reading machine of claim 1 wherein said means for adjustably setting the value of said probability includes means for manually entering a value for said probability p within the range of 0 to 1.

3. The document reading machine of claim 1 wherein said means for setting the value of said probability comprises control means for monitoring the rate that reject characters are generated by said first logic while characters are read from said documents, and for decreasing said probability p in response to a predetermined increase in said rate.

4. The document reading machine of claim 3, wherein said control means initially sets said probability p at one and does not begin to decrease said probability p until said rate has exceeded a first predetermined value.

5. The document reading machine of claim 4, wherein said control means sets said probability p at zero when said rate has exceeded a second predetermined value.

6. A document reading machine comprising a document transport for moving a plurality of documents encoded with magnetic ink characters from a document hopper to a document stacker, a first character reading system, including an AC magnetic ink character read head, mounted adjacent said transport for reading the magnetic characters on the documents being transported by said transport;

a second character reading system, including a DC magnetic ink character read head, mounted adjacent said transport between said first system and said stacker for also reading said magnetic characters on said documents;

first character recognition logic for recognizing magnetic ink characters read by first system and generating a reject character when a character cannot be recognized, said first logic periodically creating a first undetected error by recognizing a character when a reject character should have been generated;

second character recognition logic for recognizing magnetic ink characters read by said second system and generating said reject character when a character cannot be recognized, said second logic periodically creating a second undetected error by recognizing a character when said reject character should have been generated;

decision logic for choosing one of: a character recognized by said first logic, said reject character, and a character recognized by said second logic, as the character most accurately representing a character on said document; and said decision logic including means for substantially randomly choosing with a probability of p, said character generated by said second logic when said first logic generates said reject character, where p is a probability having a value within the range from 0 to 1; and means for adjustably setting the value of said probability p within the range of from 0 to 1.

7. A method for reading characters on documents, in which the characters are read by first and second characters reading systems associated respectively with first and second recognition systems which either recognize the character or generate a reject character when a character cannot be recognized, and wherein periodically an undetected error is created by recognizing a character incorrectly when a reject character should have been generated, the improvement which comprises substantially randomly choosing with a probability of p as the character most accurately representing a character on the document, said character generated by said second recognition system when the first recognition system generates a reject character, where p is a probability which is adjustable within the range from 0 to 1.

8. A document reading machine comprising
a first character reading system mounted by reading characters on documents;

a second character reading system also mounted for reading said character on said documents;

first character recognition logic for recognizing characters read by first system and generating a reject character when a character cannot be recognized, said first logic periodically creating a first undetected error by recognizing a character when a reject character should have been generated;

second character recognition logic for recognizing characters read by said second system and generating said reject character when a character cannot be recognized, said second logic periodically creating a second undetected error by recognizing a character when said reject character should have been generated;

decision logic for choosing one of: a character recognized by said first logic, said reject character, and a character recognized by said second logic, as the character most accurately representing a character on said document; and said decision logic including means for substantially randomly choosing with a probability of p, said character generated by said second logic when said first logic generates said reject character, where p is a probability having a value within the range from 0 to 1; and control means responsive to a change in the rate of generation of reject characters by said first and second recognition logic for altering the value of said probability p.

9. A document reading machine comprising
a document transport for moving a plurality of documents encoded with magnetic ink characters from a document hopper to a document stacker, a first character reading system, including an AC magnetic ink character rear head, mounted adjacent said transport for reading the magnetic characters on the documents being transported by said transport;

a second character reading system, including a DC magnetic ink character read head, mounted adjacent said transport between said first system and said stacker for also reading said magnetic characters on said documents;

first character recognition logic for recognizing magnetic ink characters read by first system and generating a reject character when a character cannot be recognized, said first logic periodically creating a first undetected error by recognizing a character when a reject character should have been generated;

second character recognition logic for recognizing magnetic ink characters read by said second system and generating said reject character when a character cannot be recognized, said second logic periodically creating a second undetected error by recognizing a character when said reject character should have been generated;

decision logic for choosing one of: a character recognized by said first logic, said reject character, and a character recognized by said second logic, as the character most accurately representing a character on said document; and said decision logic including means for substantially randomly choosing with a probability of p, said character generated by said second logic when said first logic generates said reject character, where p is a probability having a value within the range from 0 to 1; and control means responsive to a change in the rate of generation of reject characters by said first or second recognition logic for altering the value of said probability p.

10. A method for reading characters on documents, in which the characters are read by first and second character reading systems associated respectively with first and second recognition systems which either recognize the character or generate a reject character when a character cannot be recognized, and wherein periodically an undetected error is created by recognizing a character incorrectly when a reject character should have been generated, the improvement which comprises substantially randomly choosing as the character most accurately representing a character on the document, said character generated by said second recognition system when the first recognition system generates a reject character and varying the probability within the range from 0 to 1 to randomly choose the character generated by said second recognition system in response to a change in the reject rate of said first recognition system.

* * * * *

UNITED STATES PATENT AND TRADEMARK OFFICE
CERTIFICATE OF CORRECTION

PATENT NO. : 4,876,735

DATED : October 24, 1989

INVENTOR(S) : William C. Martin, et al.

It is certified that error appears in the above-identified patent and that said Letters Patent is hereby corrected as shown below:

Column 2, line 4, "ut" should be -- but --

Column 6, line 56, after "value" insert -- within the range --

Column 6, lines 57 and 58, delete "within the range"

Column 7, line 49, delete "of"

Column 7, line 67, delete "by and insert -- for --

Column 8, line 2, "character" should be -- characters --

Signed and Sealed this

Twenty-second Day of January, 1991

*Attest:*

HARRY F. MANBECK. JR.

*Attesting Officer*     *Commissioner of Patents and Trademarks*

UNITED STATES PATENT AND TRADEMARK OFFICE
CERTIFICATE OF CORRECTION

PATENT NO. : 4,876,735

DATED : October 24, 1989

INVENTOR(S) : William C. Martin, et al.

It is certified that error appears in the above-identified patent and that said Letters Patent is hereby corrected as shown below:

Column 2, line 4, "ut" should be -- but --

Column 6, line 56, after "value" insert -- within the range --

Column 6, lines 57 and 58, delete "within the range"; line 58 before "said" insert -- of --; after "range" delete "of"

Column 7, line 49, delete "of"

Column 7, lines 51 and 52, "characters" (second occurrence) should be -- character --

Column 7, line 60, after "p" insert -- , --

Column 7, line 67, delete "by" and insert -- for --

Column 8, line 2, "character" should be -- characters --

This certificate supersedes Certificate of Correction issued January 22, 1991.

Signed and Sealed this

Twenty-fifth Day of June, 1991

*Attest:*

HARRY F. MANBECK, JR.

*Attesting Officer*     *Commissioner of Patents and Trademarks*